Sept. 22, 1959  A. N. WENNERSTROM  2,905,139
INDICATORS
Filed Oct. 16, 1957

INVENTOR.
ARTHUR N. WENNERSTROM
BY Hudson, Boughton,
Williams, David & Hoffmann
ATTORNEYS United States Patent Office
2,905,139
Patented Sept. 22, 1959

2,905,139

INDICATORS

Arthur N. Wennerstrom, Lyndhurst, Ohio, assignor to The National Screw & Manufacturing Company, Cleveland, Ohio, a corporation of Ohio Application October 16, 1957, Serial No. 690,575

3 Claims. (Cl. 116—135)

The present invention relates generally to indicators of the type employing a linear scale and has particular reference to the provision of improvements in the pointers and in the means for supporting the pointers.

Many attempts have been heretofore made to secure a wire type indicator to a chain which is moved relative to a scale or like index at a predetermined rate. These attempts, however, have proved unsuccessful for one reason or another. Soldering or welding of a wire type indicator to a chain, for example, is generally unsatisfactory due to the resulting damage to the chain, the prohibitive cost of such an operation and the overall unsatisfactory results obtained therefrom.

The principal object of this invention is to provide a novel and improved indicator means comprising a wire type indicator pointer connected to a ladder type sprocket chain which will overcome the objections to similar prior art devices.

Another object of the invention is to provide a novel and improved indicator comprising a wire type indicator pointer connected to a ladder type sprocket chain by having portions of the indicator interlaced with a plurality of links of the chain, to provide a support for the indicator which is not only rigid but results in no damage to the links of the chain which would impair the usefulness thereof.

A further object of this invention is to provide a simple and economical wire type pointer connected to a supporting ladder type sprocket chain for use in washing machines and other mechanisms which use a unidirectional pointer for indicating each stage of the operation being performed.

The foregoing and other objects and advantages of the invention will appear from the following disclosure and appended claims when considered in connection with the accompanying drawings which form a part of the specification and wherein like reference characters designate corresponding parts in several views.

Before explaining in detail the present invention, it is to be understood that the invention is not limited in its application to the details and arrangement of parts illustrated in the accompanying drawings, since the invention is capable of other embodiments and of being practiced or carried out in various ways. It is to be understood also that the phraseology or terminology employed herein is for the purpose of description and not of limitation; and it is not intended to limit the invention herein claimed beyond the requirements of the prior art.

Figure 1:
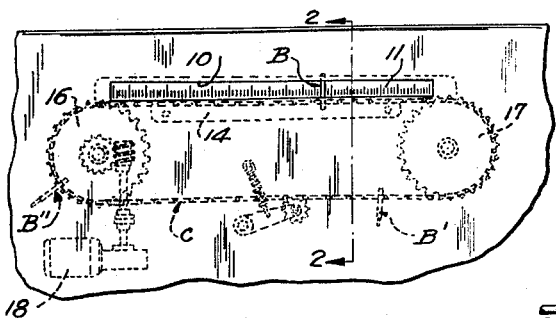
Fig. 1 is a fragmentary front elevational view of an appliance embodying the present invention.
Figure 2:
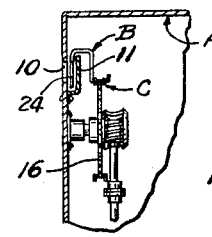
Fig. 2 is a fragmentary sectional view approximately on the line 2—2 of Fig. 1.
Figure 5:
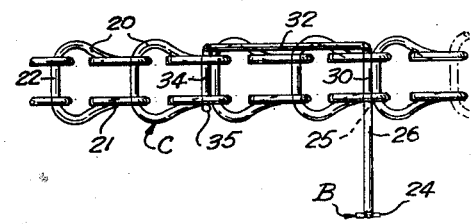
Fig. 5 is a plan view of the sprocket chain and indicator of Fig. 4.
Figures 3, 6:
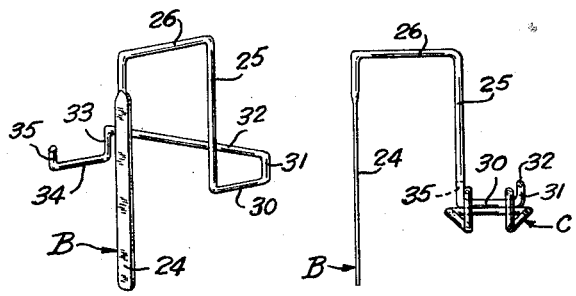
Fig. 3 is an enlarged perspective view of the indicator pointer.
Fig. 6 is a sectional view on the line 6—6 of Fig. 4.
Figure 4:
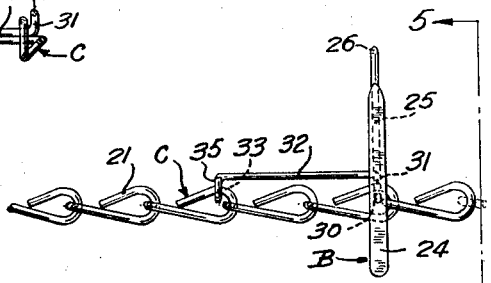
Fig. 4 is an enlarged front elevational view of the sprocket chain and indicator pointer.

Referring to the drawings, and particularly to Figs. 1 to 6, the invention is shown as embodied in a home appliance such as an automatic clothes washer having an enclosing housing A provided with an elongated slot 10 through which a linear scale 11 is visible and along which an indicator pointer B is adapted to travel and be automatically moved as the machine goes through the washing and drying cycles, etc. The linear scale 11 is formed along the front upper edge of a plate-like member 14 extending slightly beyond the ends of the slot 10 and having its lower edge connected to the enclosing housing A. The upper part of the member 14 is offset slightly to the rear of the housing A so that the pointer B which is connected to and carried by a ladder type sprocket chain C in a manner hereinafter described, can move therealong without interference from the housing. The chain C is looped about two sprocket wheels 16, 17 rotatably supported on suitable shafts fixed in the housing A adjacent to but preferably spaced slightly beyond opposite ends of the member 14. One of the sprocket wheels, in the present instance the wheel 16, is adapted to be driven in a predetermined manner in accordance with the cycle of operation of the machine by a unidirectional motor 18. It is, however, to be understood that either or both of the sprocket wheels 16, 17 may be driven in any suitable manner.

The ladder type sprocket chain C consists of a plurality of generally horse-shoe-shaped links 20 having generally parallel extending arms 21 bent back upon themselves in a 180° angle to extend in a general direction of the train of chain links 20. Each pair of parallel arms 21 are bent about the base or transverse portion 22 of an adjoining horseshoe-shaped link 20 so that a continuous chain is developed with the transverse portion 22 of one link extending through the eyes of an adjoining link formed by the arms 21.

The indicator pointer B as shown is formed of a single length of wire and comprises a bight or U-shaped portion which engages over the upper edge of the metal member 14 and which may ride thereupon if desired. The front arm 24 of the U-shaped portion of the pointer is flattened as shown and acts as the pointer proper. From the lower end of the rear arm 25 of the U-shaped portion, the wire extends in a direction generally parallel with but opposite to that of the portion 26 which connects the arms 24, 25, that is, in a direction away from the indicator blade or front arm 24 and forms one leg or shank 30 of a support means or base of the pointer. The length of the leg 30 is such that it will extend through the eyes of a link. The wire at the rear or free end of the leg 30 is bent upwardly for a short distance to form a short section 31. At the top of the section 31 the wire is bent at right angles to the section 31 and in the general direction of a length of the sprocket chain C and define or form a longitudinally extending portion 32. At the end of the portion 32 the wire is then bent at right angles thereto and in a downwardly direction to form a short section 33 equal in length and parallel with the short section 31. At the bottom of section 33 the wire is again bent at right angles and in the general direction transversely of the sprocket chain for defining or forming a second shank or leg 34 parallel with and equal in length to the shank or leg 30. The portions 30, 34 lie in the same plane and together with the portions 31—33 form the base or support means of the indicator pointer. The terminal end of the wire adjoining the portion 34 is bent at right angles thereto in an upwardly direction and generally parallel with the arm 25 to form a locking finger 35. The shank or leg portions 30, 34 are of a length substantially that of the width of the sprocket chain C and the length of the longitudinally extending portion 32 is a multiple of the length of one of the links of the chain. The short vertical sections 31, 33 raise the longitudinal section 32 above that portion of the link or links which it overlies and which projects beyond or is wider than the eye part of the link so as to prevent interference therebetween as the chain goes around the sprocket wheels.

The indicator pointer B is secured to the sprocket chain C by inserting the shank or leg portions 30, 34 within the bight or eye of the backwardly bent parallel arms or links of the chain. In the embodiment shown, the length of the member 32 is equal to that of two links of the chain C from which it follows that the legs 30, 34 project through the eyes of two links of the chain which are separated by a link. Alternately, the pointer B could be connected to adjacent links. In this event, the length of the member 32 would be made equal to that of a link of the chain.

The indicator pointer B can be easily assembled with the chain C by bending up the respective parallel arms of the selected links of the chain so as to open the eyes sufficiently to permit the legs 30, 34 to be simultaneously slid into the eyes. The eyes are then closed. In the embodiment shown three indicator pointers are employed. It is, however, to be understood that one or more may be used as desired.

The present invention contemplates a construction wherein the indicator pointer may travel continuously in the same direction. The sprocket chain C and the pointer B are, therefore, so connected as not to interfere with the passage of that part of the sprocket chain with which the pointer is interlaced about the sprocket wheels. As will be apparent, it is advantageous to have the legs 30, 34 spaced apart as far as possible. The spacing, however, is to a certain extent a function of the diameter of the sprocket wheels.

Figure 9:
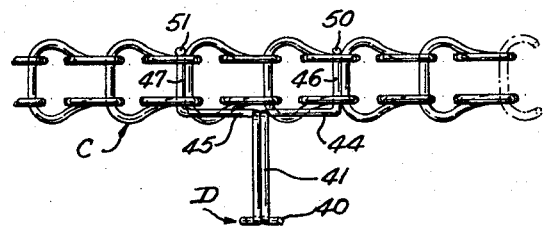
Figs. 7, 8, 9 and 10 are views similar to Figs. 3, 4, 5, 6 but of an alternative embodiment of the invention.
Figure 7:
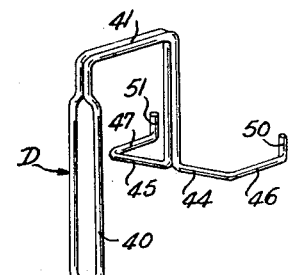
Figures 8, 10:
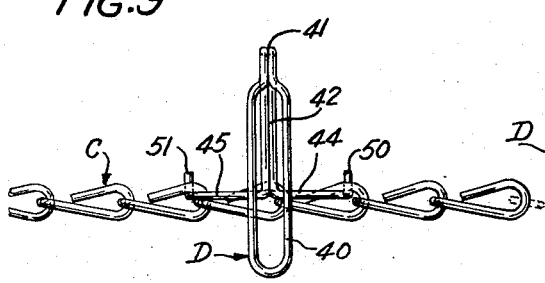

A second embodiment of the invention is shown in Figs. 7, 8, 9 and 10. The indicator pointer shown therein and designated generally by the reference character D comprises an open wire loop 40 which forms the pointer proper and through which the graduations on a scale may be viewed. The open wire loop 40 corresponds with the front arm 24 of the indicator pointer B. At the upper end of the loop 40, the wires are brought together and bent at right angles to form a portion 41 corresponding with portion 26 of the indicator B. The wires are then bent parallel with the loop 40 to form a rear portion or arm 42. At the lower end of the portion 42, the wires are bent at right angles and in opposite directions to form base portions 44, 45 corresponding to the portion 32 of the pointer B. The portions 44, 45 extend in opposite directions a distance equal to the length of one, two or three links of the chain, as desired, at which point they are bent at right angles in a direction generally parallel to the portion 41, but in a direction opposite to the loop 40 to form shanks or arms 46, 47 which correspond to the parts 30, 34 of indicator D and project or extend through the eyes of the chain. After extending a distance approximately equal to the width of the chain, the two terminal ends of the wire are bent upwardly at right angles and generally parallel with the arm 42 to form locking fingers 50, 51.

The indicator pointer D can be assembled with the chain C in a manner similar to that in which the indicator pointer B is assembled with the chain or it can be assembled with the chain without the necessity of opening the eyes of the link by inserting the legs 46, 47 through the eyes and subsequently forming the locking fingers 50, 51 on the ends of the respective legs. The longitudinally extending parts 44, 45 of the pointer D can be raised above the parts of the chain which they overlie, if desired, by offsetting the parts 46, 47 in a downwardly direction in a manner similar to that in which the parts 30, 34 of the pointer C are offset downwardly with respect to the parts 32 by the short sections of wire 31, 33.

The indicator pointers shown are made of wire bent in the manner described but it is to be understood that other material may be employed. For example, the pointers may be made of thermosetting plastic in which event they would preferably be made in their final form and assembled with the chain by opening the eyes of the selected links.

Two forms of wire type indicators have been described which can be easily and economically made and attached to a sprocket chain in accordance with the present invention. It is to be understood, however, that the invention is not limited to these two embodiments, but is susceptible of many changes and modifications, for example, the parts 24, 26 of indicator pointer B may be omitted in which event the part 25 would be the pointer proper, and I intend to cover all such changes and modifications which come within the scope of the appended claims.

Having thus described my invention, I claim:

1. In a device of the character described, a dial face having indicia thereon, rotatable sprocket wheel means located adjacent to said dial face, a ladder type chain encircling said sprocket wheel means and comprising a plurality of U-shaped links connected in series, said U-shaped links each having generally parallel arms connected by a base member, said arms having eyelets in the free ends thereof encircling the base of the adjoining U-shaped link, a pointer movable over the indicia on said dial face, said pointer terminating in a base portion having a pair of leg members disposed in spaced parallel relation to one another, said leg members extending transversely of said chain through the eyelets of separate chain links, and said pointer movable along said dial face upon rotation of said sprocket wheel means.

2. An indicator device as set forth in claim 1, wherein at least one of said leg members has means thereon to secure said leg member in the eyelet through which it projects.

3. In a device of the character described in claim 1, wherein said pointer and base member are formed of a single strand of wire.

References Cited in the file of this patent

UNITED STATES PATENTS 2,521,564    Bernard _____ Sept. 5, 1950